No. 784,673. PATENTED MAR. 14, 1905.
T. M. GEORGE.
STEERING GEAR FOR VEHICLES.
APPLICATION FILED JUNE 25, 1904.
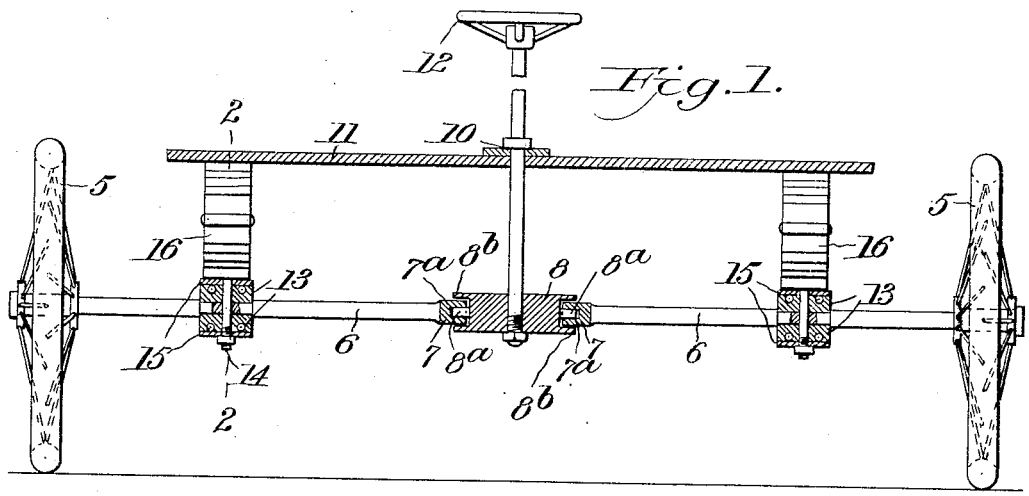
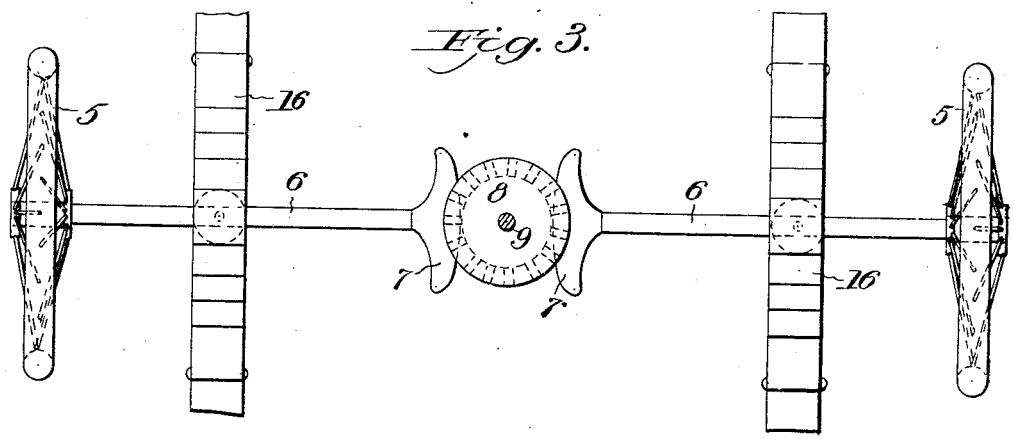
WITNESSES:
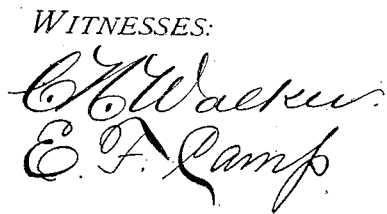
INVENTOR
Thomas M. George
BY
Milo B. Stevens & Co.
Attorneys No. 784,673. Patented March 14, 1905.

UNITED STATES PATENT OFFICE.

THOMAS M. GEORGE, OF CLEVELAND, OHIO.

STEERING-GEAR FOR VEHICLES.

SPECIFICATION forming part of Letters Patent No. 784,673, dated March 14, 1905.

Application filed June 25, 1904. Serial No. 214,185.

*To all whom it may concern:*

Be it known that I, THOMAS M. GEORGE, a citizen of the United States, residing at Cleveland, in the county of Cuyahoga and State of Ohio, have invented new and useful Improvements in Steering-Gear for Vehicles, of which the following is a specification.

This invention is a steering-gear for vehicles, particularly suitable for motor-vehicles.

The object of the invention is to improve such hand-operated steering-gears by a construction permitting quick and positive action.

In the accompanying drawings, Figure 1 is a sectional view illustrating the invention. Fig. 2 is a section on the line 2 2 of Fig. 1. Fig. 3 is a plan view. Fig. 4 is a detail in perspective of the pin-wheel and a segment.

Referring specifically to the drawings, 6 indicates the axle-sections, and 5 the wheels thereon. At the inner end each axle-section has a segment 7, having holes 7$^a$, which are engaged by pins 8$^a$ of the pin gear-wheel. This wheel engages the segments of both axle-sections, so that a similar turn is imparted to each wheel 5. The gear-wheel 8 has peripheral flanges 8$^b$ on each side or edge thereof, and these flanges embrace the segments referred to and prevent the same from getting displaced by a side strain or otherwise. Said wheel 8 is carried at the lower end of the shaft 9, which extends through a bearing 10 on the floor 11 of the vehicle, and said shaft is provided at the top with a hand-wheel 12 for manipulation.

Each axle-section is pivoted to the frame of the machine by means of a split box and bolt. The upper and lower halves of the boxing are indicated at 13, and the axle 6 is squared where it extends through a mortise produced by grooves in the meeting faces of the boxing-sections. A pivot-bolt 14 extends vertically through the boxing and the axle and also through the side bars or beams 15 of the vehicle running-gear, also through the leaf-spring 16, on which the carriage-body rests. Said bolt 14 thus acts as a pivot-bolt and also as a means for holding the spring and axle-box in proper position. Halves 13 of the boxing each have in the outer faces thereof raceways to receive the balls 17, which bear against the inner sides of the bars 15. A ball-bearing is thus formed, which permits the boxing and axle section to turn readily. The flanged pin-wheel meshing with the socket-segments transmits a steady and positive motion with little liability of slip or disengagement, which would be apt to occur with ordinary gear-wheels in sudden strain or in case the roughness of the road should cause the wheel on one side to be higher than the wheel on the other.

Having thus described my invention, what I claim as new, and desire to secure by Letters Patent, is—

1. In a steering-gear for vehicles, the combination with the frame and axle-section, of a split box embracing the axle-section and having a bearing upon the frame, and a pivot-bolt extending through the box parts, and the frame.

2. In a steering-gear for vehicles, the combination with upper and lower spaced side bars of the frame, of an axle-section extending between said bars, a boxing inclosing the axle and having a bearing against said bars, and a pivot-bolt extending through the bars, boxing and axle.

3. In a steering-gear for vehicles, the combination with a frame, and axle-section, of a box through which the axle-section extends, a pivot-bolt extending through the box and frame, and bearing-rollers between the box and frame, around the bolt.

In testimony whereof I have signed my name to this specification in the presence of two subscribing witnesses.

THOMAS M. GEORGE.

Witnesses:
JOHN A. BOMMHARDT,
LOTTIE NEWBURN.